United States Patent
Ho et al.

(10) Patent No.: US 10,725,510 B2
(45) Date of Patent: Jul. 28, 2020

(54) DEVICE CONFIGURATION-BASED THERMAL MANAGEMENT CONTROL

(71) Applicant: Microsoft Technology Licensing, LLC, Redmond, WA (US)

(72) Inventors: Chau Van Ho, DesMoines, WA (US); Bo Dan, Redmond, WA (US); Brandon Earl Gary, Redmond, WA (US); Gary Russell McClary, Palisade, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 15/924,157

(22) Filed: Mar. 16, 2018

(65) Prior Publication Data
US 2019/0286200 A1  Sep. 19, 2019

(51) Int. Cl.
*G06F 11/30* (2006.01)
*G06F 1/20* (2006.01)
(Continued)

(52) U.S. Cl.
CPC ............ *G06F 1/206* (2013.01); *G06F 1/1616* (2013.01); *G06F 1/1618* (2013.01);
(Continued)

(58) Field of Classification Search
CPC . G06F 1/206; G06F 1/203; G06F 1/28; G06F 1/1647; G06F 1/1677; G06F 1/1616; G06F 1/1681
(Continued)

(56) References Cited

U.S. PATENT DOCUMENTS 9,317,090 B2    4/2016  Culbert et al.
2002/0057267 A1*  5/2002 Turnbull ................. G02B 5/23
                                                   345/204
(Continued)

FOREIGN PATENT DOCUMENTS

EP         2096517 A2    9/2009

OTHER PUBLICATIONS

"Magnetic sensor/switch issue on Asus G53SW-XN1 when closing the lid", Retrieved From <<https://web.archive.org/web/20150403021447/http:/forum.notebookreview.com/threads/magnetic-sensor-switch-issue-on-asus-g53sw-xn1-when-closing-the-lid.620997/>>, Apr. 3, 2015, 10 Pages.
(Continued)

*Primary Examiner* — Volvick Derose
(74) *Attorney, Agent, or Firm* — Ray Quinney & Nebeker P.C.; Paul N. Taylor

(57) ABSTRACT

Cooling of an electronic device that includes a first portion and a second portion is provided. The first portion and the second portion are rotatable relative to each other. A first sensor measures a first temperature at a first location within or on the electronic device continuously or intermittently. A second sensor measures a second temperature at a second location within or on the electronic device continuously or intermittently. A processor identifies a first state of the electronic device or a second state of the electronic device. The processor controls operation of the electronic device based on the first measured temperature and the second measured temperature when the electronic device is in the identified first state and controls the operation of the electronic device based on the first measured temperatures but not based on the second measured temperatures when the electronic device is in the identified second state.

19 Claims, 7 Drawing Sheets

(51) Int. Cl.
G06F 1/16 (2006.01)
G06F 1/28 (2006.01)
H04M 1/02 (2006.01)
G06F 1/30 (2006.01)

(52) U.S. Cl.
CPC .......... *G06F 1/1647* (2013.01); *G06F 1/1649* (2013.01); *G06F 1/1677* (2013.01); *G06F 1/1694* (2013.01); *G06F 1/203* (2013.01); *G06F 1/28* (2013.01); *H04M 1/0206* (2013.01); *H04M 1/0214* (2013.01); *G06F 1/1681* (2013.01); *G06F 1/30* (2013.01); *H04M 2250/12* (2013.01)

(58) Field of Classification Search
USPC ......................................................... 713/340
See application file for complete search history.

(56) References Cited

U.S. PATENT DOCUMENTS

| | | | |
|---|---|---|---|
| 2005/0024339 A1* | 2/2005 | Yamazaki ............. | G06F 1/1616 345/169 |
| 2005/0049729 A1* | 3/2005 | Culbert .................. | G06F 1/206 700/50 |
| 2006/0139326 A1* | 6/2006 | Tsukamoto ........... | G06F 1/1616 345/158 |
| 2009/0016003 A1 | 1/2009 | Ligtenberg et al. | |
| 2010/0235012 A1* | 9/2010 | Cox ....................... | G06F 1/1677 700/299 |
| 2011/0181565 A1* | 7/2011 | Asamura .................. | G01J 1/32 345/207 |
| 2011/0254876 A1* | 10/2011 | Yokoyama ............ | G06F 3/1446 345/690 |
| 2013/0013126 A1 | 1/2013 | Salsberry et al. | |
| 2014/0152576 A1* | 6/2014 | Kim ....................... | G06F 1/1677 345/169 |
| 2016/0048363 A1* | 2/2016 | North ..................... | G06F 1/1616 345/1.1 |
| 2016/0133202 A1* | 5/2016 | Saito ........................ | H04N 9/12 345/690 |
| 2016/0299539 A1* | 10/2016 | Jang ....................... | G06F 1/1681 |
| 2017/0177034 A1 | 6/2017 | North et al. | |
| 2017/0255442 A1* | 9/2017 | Kim ..................... | G06F 3/04883 |
| 2017/0337895 A1 | 11/2017 | Kosugi et al. | |
| 2018/0059721 A1* | 3/2018 | Akimoto ............... | G06F 1/1618 |
| 2018/0164854 A1* | 6/2018 | Wood ..................... | G05D 23/19 |

OTHER PUBLICATIONS

"International Search Report and Written Opinion Issued in PCT Patent Application No. PCT/US19/021506", dated Jun. 4, 2019, 17 Pages.

* cited by examiner

DEVICE CONFIGURATION-BASED THERMAL MANAGEMENT CONTROL

BRIEF DESCRIPTION OF THE DRAWINGS

For a more complete understanding of the disclosure, reference is made to the following detailed description and accompanying drawing figures, in which like reference numerals may be used to identify like elements in the figures.

Figure 1:
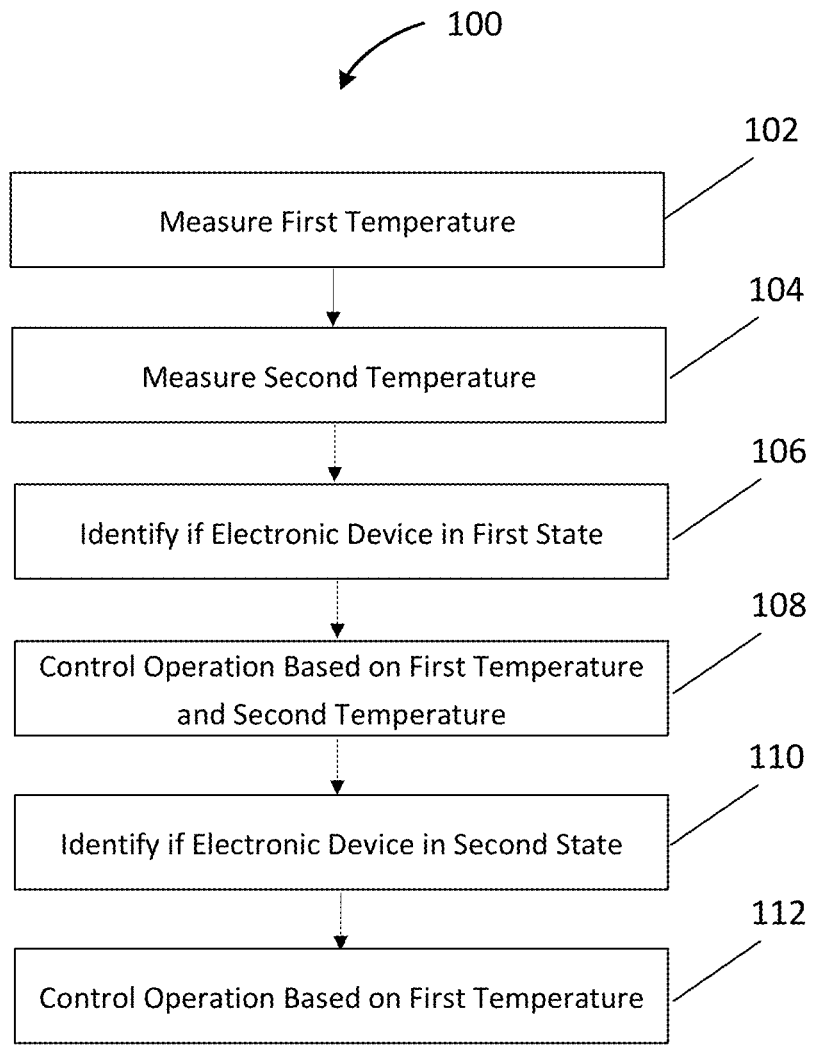
FIG. 1 is a flow diagram of a method for cooling an electronic device in accordance with an example.

While the disclosed devices, systems, and methods are representative of embodiments in various forms, specific embodiments are illustrated in the drawings (and are hereafter described), with the understanding that the disclosure is intended to be illustrative, and is not intended to limit the claim scope to the specific embodiments described and illustrated herein.

DETAILED DESCRIPTION

Current microprocessor design trends include designs having an increase in power, a decrease in size, and an increase in speed. This results in higher power in a smaller, faster microprocessor. Another trend is towards lightweight and compact electronic devices. As microprocessors become lighter, smaller, and more powerful, the microprocessors also generate more heat in a smaller space, making thermal management a greater concern than before.

The purpose of thermal management is to maintain the temperature of a device within a moderate range. During operation, electronic devices dissipate power as heat that is to be removed from the device. Otherwise, the electronic device will get hotter and hotter until the electronic device is unable to perform efficiently. When overheating, electronic devices run slowly and dissipate power poorly. This can lead to eventual device failure and reduced service life.

As computing devices get smaller (e.g., thinner), thermal management becomes more of an issue. Heat may be dissipated from a computing device using forced and natural convection, conduction, and radiation as a way of cooling the computing device as a whole and a processor operating within the computing device. For forced convection, a computing device may include one or more fans used to move air through the computing device and cool one or more heat generating components of the computing device.

Thermal management systems of the prior art may use sensors to track temperatures within and/or on the computing device (e.g., corresponding to heat generating components within the computing device and/or outer surface temperatures for the computing device) and decrease processing speed (e.g., throttle) for one or more heat generating components (e.g., processors) when a tracked temperature approaches, reaches, or exceeds a temperature limit for the corresponding component within the computing device or an outer surface of the computing device. The temperature limits for the components protect against failure of the components, respectively, and the temperature limit at the outer surfaces of the computing device protects the user contacting the computing device during use. System performance is reduced to maintain all temperatures within the computing device within limits. Thermal response, however, lags electrical response. In other words, the thermal time constant is longer than the electrical time constant. This may cause the thermal management system to over cool or under cool the computing device. Over cooling the computing device results in lower system performance due to early throttling, and under cooling the computing device may cause safety issues such as, for example, burning the user.

A multi-display computing device includes a first portion and a second portion rotatably attached to the first portion. For example, the first portion and the second portion include a first display and a first chassis, and a second display and a second chassis, respectively. The second portion may be positioned in any number of angular positions relative to the first portion. For example, in a closed position of the computing device, the first chassis abuts the second chassis (e.g., abutting chassis) or the first display abuts the second display (e.g., abutting displays). When the computing device is in the closed position, sensors track one or more temperatures at the abutting chassis or the abutting displays.

A user of the multi-display computing device cannot contact the abutting chassis or the abutting displays when the computing device is in the closed position. In the prior art, however, the computing device is still controlled based on the one or more tracked temperatures at the abutting chassis or the abutting displays, even though the user cannot contact the abutting chassis or the abutting displays when the computing device is in the closed position. In other words, when the computing device is in the closed position, operation of the computing device is controlled, for the safety of the user, based on one or more temperatures tracked at positions on the computing device that the user cannot touch.

Disclosed herein are apparatuses, systems, and methods for controlling operation of a multi-display computing device based on an orientation of the computing device. The computing device includes a first portion having a first display and a first chassis, and a second portion having a second display and a second chassis. The first portion is rotatably attached to the second portion.

A sensor of the computing device identifies a state of the computing device. For example, the sensor (e.g., a state sensor) identifies user interaction with a user interface, movement of the first portion relative to the second portion and/or movement of the second portion relative to the first portion, or an angular position of the second portion relative to the first portion and/or an angular portion of the first portion relative to the second portion. The computing device also includes temperature sensors configured to monitor temperatures at or adjacent to outer surfaces of the computing device (e.g., outer surfaces of the first display, the first chassis, the second display, and/or the second chassis, respectively).

When, for example, the state sensor identifies the state or the change in state of the computing device, the operation of the computing device is controlled based on the state or the change in state of the computing device. For example, the state sensor monitors a magnetic push to open (PTO) interface of the computing device, and the operation of the computing device is controlled based on a state of the magnetic PTO interface of the computing device.

If the magnetic PTO interface is in an unlocked position, a processor of the computing device controls the operation of the computing device based on all monitored temperatures on and/or within the computing device. For example, the monitored temperatures are compared to predetermined temperature limits, respectively, and power supplied by a power source of the computing device is decreased and/or a processing speed for the processor and/or other processors of the computing device is decreased when one of the monitored temperatures is greater than the respective temperature limit.

If the magnetic PTO interface in in a locked position, the processor controls the operation of the computing device based on a subset of the monitored temperatures. For example, sensors at positions the user is unlikely to contact may be deactivated, or the processor may not use temperatures monitored at such positions when controlling the operation of the computing device. Positions the user is unlikely to contact may include, for example, positions at or adjacent to abutting surfaces of the multi display computing device. For example, when the computing device is in the closed position (e.g., with the magnetic PTO interface in the locked position) with the first display and the second display facing away from each other and the first chassis and the second chassis abutting each other, the processor controls the operation of the computing device based on monitored temperatures at or adjacent to outer surfaces of the first display and the second display, respectively, but not monitored temperatures at or adjacent to outer surfaces of the first chassis and the second chassis, respectively. In other words, temperature sensors at or adjacent to the outer surfaces of the first chassis and the second chassis, respectively, are deactivated, or the processor does not use temperatures monitored by such sensors when controlling the operation of the computing device.

If the magnetic PTO interface changes from the locked position to the unlocked position (e.g., the computing device transitions from the closed position to the open position), the processor immediately throttles the power supplied by the power source of the computing device. For example, the processor throttles the power supplied by the power source of the computing device by a predetermined amount or percentage (e.g., 10%). The amount or percentage may be predetermined based on known system characteristics (e.g., a reduction in power by 10% will reduce temperature by 3 degrees Celsius) for user safety.

Other state sensors may be used, and other control of the operation of the computing device may be provided. For example, the state sensor may identify an angular position of the second portion relative to the first portion, and the operation of the computing device may be based on identified angular position.

The thermal management system controlled in this way provides optimal thermal management for the computing device. Optimal thermal management may provide an increase in system performance and an increase in computing device life expectancy.

As an example, the more optimal heat dissipation from an electronic device may be implemented by a method for cooling the electronic device. The electronic device includes a first portion and a second portion. The first portion and the second portion are rotatable relative to each other. The method includes measuring, by a first sensor, a first temperature at a first location within or on the electronic device continuously or intermittently, and measuring, by a second sensor, a second temperature at a second location within or on the electronic device continuously or intermittently. A processor identifies a first state of the electronic device or a second state of the electronic device. The processor controls operation of the electronic device based on the first measured temperature and the second measured temperature when the electronic device is in the identified first state and controls the operation of the electronic device based on the first measured temperature but not based on the second measured temperature when the electronic device is in the identified second state.

Such apparatuses, systems, and methods for controlling operation of a computing device have several potential end-uses or applications, including any electronic device to be cooled. For example, the control may be incorporated into personal computers, server computers, tablet or other handheld computing devices, laptop or mobile computers, gaming devices, communications devices such as mobile phones, multiprocessor systems, microprocessor-based systems, set top boxes, programmable consumer electronics, network PCs, minicomputers, mainframe computers, or audio or video media players. In certain examples, the control may be incorporated within a wearable electronic device, where the device may be worn on or attached to a person's body or clothing. The wearable device may be attached to a person's shirt or jacket; worn on a person's wrist, ankle, waist, or head; or worn over their eyes or ears. Such wearable devices may include a watch, heart-rate monitor, activity tracker, or head-mounted display.

Using one or more of these features described in greater detail below, more optimized heat dissipation may be provided for the electronic device. With the more optimized heat dissipation feature, a more powerful microprocessor may be installed for the electronic device, a thinner electronic device may be designed, a higher processing speed may be provided, the electronic device may be operated at a higher power for a longer period of time, fans may be operated at a lower speed, or any combination thereof may be provided when compared to a similar electronic device without one or more of the improved heat dissipation features. In other words, the heat dissipation features described herein may provide improved thermal management for an electronic device such as a mobile phone, tablet computer, or laptop computer.

FIG. 1 shows a flowchart of one example of a method 100 for cooling an electronic device. The method 100 is implemented in the order shown, but other orders may be used. Additional, different, or fewer acts may be provided. Similar methods may be used for cooling an electronic device.

The electronic device may be a computing device shown in FIGS. 3-7, or may be another electronic device. For example, the electronic device includes a first portion and a second portion rotatable and/or translatable relative to each other. In one example, the first portion of the electronic device includes a first display and a first chassis opposite the first display, and the second portion of the electronic device includes a second display and a second chassis opposite the second display. The first portion and the second portion may be rotatable relative to each other via, for example, a hinge, and/or translatable relative to each other via, for example, one or more tracks.

The electronic device includes a thermal management system. The thermal management system includes one or more sensors that monitor temperatures (e.g., temperature sensors) on or in the electronic device. The electronic device includes at least one heat generating component (e.g., a processor) that is supported within the first portion and/or the second portion of the electronic device. The processor is in communication with the temperature sensors. The temperature sensors may be any number of different types of temperature sensors including, for example, a thermocouple, a resistance temperature detector (RTD) (e.g., a resistance wire RTD or a thermistor), or another type of temperature sensor. All of the temperature sensors may be the same type of temperature sensor, or different types of temperature sensors may be used within the electronic device.

The thermal management system includes temperature sensors that monitor temperatures within the electronic device. For example, temperature sensors of the thermal management system may monitor operating temperature of heat generating components within the electronic device. Temperature sensors may, for example, be positioned on or adjacent to corresponding heat generating components within the electronic device, respectively. In one example, temperature sensors monitor temperatures at positions within the electronic device not at or adjacent to the heat generating components. For example, a temperature sensor may monitor a temperature of a component of the thermal management system (e.g., at a position on a phase change device such as a heat pipe).

The thermal management system also includes temperature sensors that monitor temperatures on the electronic device. For example, temperature sensors of the thermal management system may monitor outer surface temperatures for the electronic device. Temperature sensors of the thermal management system may monitor temperatures at or adjacent to at least an outer surface of the first display, an outer surface of the first chassis, an outer surface of the second display, and an outer surface of the second chassis, respectively. The thermal management system may include more, fewer, and/or different temperature sensors that monitor temperatures within and/or on the electronic device.

Some or all of the temperature sensors within the thermal management system of the electronic device provide live closed-loop feedback to the thermal management system. For example, the processor receives the live temperatures from the temperature sensors and controls power supplied by a power source of the electronic device, a processing speed for the processor and/or one or more other processors within the electronic device, and/or a fan.

In act 102, a first sensor of the computing device measures a first temperature at a first position. The first position is within or on the electronic device. For example, the first position is at or adjacent to an outer surface of the first display, the first chassis, the second display, or the second chassis. The first sensor measures the first temperature continuously or intermittently. For example, the first sensor may measure the first temperature at a predetermined interval. The first sensor measures the temperature and transmits data corresponding to the measured temperature to the processor. The first sensor transmits the data to the processor continuously or at predetermined intervals wirelessly or via a wired connection. In one example, a plurality of first sensors measure temperatures at corresponding positions at or adjacent to one or more outer surfaces of the electronic device. For example, a plurality of first sensors measure temperatures at positions at or adjacent to outer surfaces of the first display and the second display, respectively. In another example, a plurality of first sensors measure temperatures at positions at or adjacent to outer surfaces of the first chassis and the second chassis, respectively.

In act 104, a second sensor measures a second temperature at a second position. The second position is within or on the electronic device. For example, the second position is at or adjacent to an outer surface of the first display, the first chassis, the second display, or the second chassis. The second sensor measures the second temperature continuously or intermittently. For example, the second sensor may measure the second temperature at a predetermined interval. The second sensor measures the temperature and transmits data corresponding to the measured temperature to the processor. The second sensor transmits the data to the processor continuously or at predetermined intervals wirelessly or via a wired connection. In one example, a plurality of second sensors measure temperatures at corresponding positions at or adjacent to one or more outer surfaces of the electronic device. For example, a plurality of second sensors measure temperatures at positions at or adjacent to outer surfaces of the first chassis and the second chassis, respectively. In another example, a plurality of second sensors measure temperatures at positions at or adjacent to outer surfaces of the first display and the second display, respectively.

In act 106, a processor identifies if the electronic device is in a first state. The electronic device may include any number of sensors (e.g., state sensors) that identify the first state, generate a signal identifying the first state when the first state is identified, and transmit the generated signal to the processor. For example, the state sensors may include optical sensors, touch sensors, Hall-effect sensors, gyroscope sensors, shaft angle transducers, other types of sensors, or any combination thereof.

The state sensors may identify any number of first states of the electronic device including, for example, locking and unlocking of a user interface, a rotational position of the second portion relative to the first portion of the electronic device and/or a rotational position of the first portion relative to the second portion of the electronic device, movement of the second portion relative to the first portion of the electronic device and/or movement of the first portion relative to the second portion of the electronic device (e.g., at a particular rate), a user touching a portion of the electronic device, other states of the electronic device, or any combination thereof.

In one example, identifying the first state of the electronic device includes identifying when the electronic device is open and/or when the electronic device is opened (e.g., transitions between the closed position and the open position). Identifying when the electronic device is open may be based on a state of a user interface of the electronic device. The user interface may be, for example, a locking mechanism such as a PTO interface (e.g., a magnetic PTO interface). In a locked state of the PTO interface, rotational movement of the first portion and the second portion of the electronic device relative to each other is prevented or restricted. In an unlocked position of the PTO interface, the first portion and the second portion of the electronic device are allowed to rotate relative to each other. The PTO interface (e.g., a sensor within the PTO interface) may generate a signal when the user engages the PTO interface to place the PTO interface within the unlocked position. The sensor within the PTO interface, for example, may be a touch sensor or another type of sensor that generates a signal identifying the PTO interface being placed in the unlocked position. The sensor within the PTO interface, for example, transmits the generated signal to the processor.

The processor may identify when the electronic device is open in any number of other ways including, for example, based on an optical sensor. For example, the electronic device may include a camera and/or other optical sensors. The camera and/or the other optical sensors may generate a signal based on an amount of light the camera and/or the other optical sensors capture, and/or a distance between the first portion and the second portion of the electronic device determined based on analysis of image data generated by the camera and/or the other optical sensors. When the electronic device is closed, the camera and/or the other optical sensors capture little light. The processor may identify that the electronic device is open when the amount of light captured by the camera and/or the other optical sensors is above a predetermine threshold. Other types of sensors may be used to determine when the electronic device is open and/or opened.

In one example, the processor identifies an angular or rotational position of the second portion relative to the first portion and/or an angular or rotational position of the first portion relative to the second portion. The electronic device may include one or more sensors (e.g., optical sensors) that monitor a rotational position of the second portion relative to the first portion of the electronic device, a rotational position of the first portion relative to the second portion of the electronic device, or rotational positions of the first portion and the second portion of the electronic device relative to each other (e.g., rotational position sensors). For example, the one or more optical sensors may track a rotational position of a portion of the hinge relative to the first portion of the electronic device. The one or more optical sensors may monitor the rotational position of the second portion relative to the first portion of the electronic device continuously or intermittently, generate a signal representing the rotational position of the second portion relative to the first portion, and transmit the generated signal to the processor. For example, the one or more optical sensors may monitor the rotational position of the second portion relative to the first portion of the electronic device at a predetermined interval.

Identifying the first state of the electronic device may include the processor determining when the monitored rotational position of the second portion relative to the first portion of the electronic device, for example, is equal to, or greater than or equal to a first predetermined angle. For example, at a predetermined interval, the processor may compare the monitored rotational position of the second portion relative to the first portion of the electronic device to the first predetermined angle, and identify when the monitored rotational position of the second portion relative to the first portion of the electronic device is equal to, or greater than or equal to the first predetermined angle based on the comparison. In one example, the first predetermined angle is five degrees, and the processor identifies that the electronic device is in the first state when the monitored rotational position of the second portion relative to the first portion of the electronic device is greater than five degrees. Other angles may be used for the first predetermined angle. For example, the first predetermined angle may be zero degrees.

In act 108, the processor controls operation of the electronic device based on the first measured temperature and the second measured temperature when the electronic device is in the identified first state. In one example, controlling the operation of the electronic device when the electronic device is in the identified first state includes decreasing, by the processor, power for the electronic device when the first state is identified. For example, the processor decreases the power for the electronic device immediately after the first state is identified. The processor decreases the power for the electronic device by any amount. For example, the processor decreases the power for the electronic device by a predetermined percentage (e.g., ten percent). In other examples, the processor decreases the power for the electronic device by a higher or lower percentage and/or a predetermined amount. In another example, the processor decreases a processing speed for the processor or another processor within the electronic device immediately after the first state is identified.

After the power for the electronic device is decreased immediately after the first state is identified, controlling the operation of the electronic device when the electronic device is in the identified first state also includes comparing, by the processor, the measured first temperature to a first predetermined temperature and the measured second temperature to a second predetermined temperature. While the electronic device is in the identified first state, the processor compares the measured first temperature to the first predetermined temperature and compares the measured second temperature to the second predetermined temperature at an interval (e.g., a predetermined interval). For example, the processor receives the measured first temperature from the first sensor and the measured second temperature from the second sensor simultaneously, and the processor compares the measured first temperature to the first predetermined temperature and the measured second temperature to the second predetermined temperature each time the processor receives the measured first temperature and the measured second temperature.

The first predetermined temperature and the second predetermined temperature may be temperature thresholds or limits. For example, the first predetermined temperature and the second predetermined temperature are surface temperature limits for the electronic device. In one example, the measured first temperature and the second measured temperature are used to calculate corresponding rates of temperature change, and the calculated rates of temperature change are compared to predetermined limits, respectively.

The first predetermined temperature, the second predetermined temperature, and any other predetermined temperature limits corresponding to other positions on or adjacent to an outer surface of the electronic device may be set with user safety in mind (e.g., to prevent burning the user). The first predetermined temperature may be the same as the second predetermined temperature. In one example, the first predetermined temperature is different than the second predetermined temperature.

Additional, fewer, and/or different measured temperatures may be compared to corresponding predetermined temperatures. For example, the processor may receive temperatures measured by temperature sensors at positions at or adjacent to heat generating components (e.g., the processor) within the electronic device and/or temperatures measured by temperature sensors at positions within the electronic device but away from the heat generating components. The processor may compare the received temperatures for positions within the electronic device, respectively, with the corresponding predetermined temperatures.

Controlling the operation of the electronic device when the electronic device is in the identified first state may also include the processor decreasing the power for the electronic device or decreasing a processing speed for the processor or another processor based on the comparison. For example, controlling the operation of the electronic device when the electronic device is in the identified first state includes the processor decreasing the power for the electronic device or decreasing the processing speed for the processor or the other processor when the measured first temperature is greater than, or greater than or equal to the first predetermined temperature or when the measured second temperature is greater than, or greater than or equal to the second predetermined temperature. The processor may decrease the power for the electronic device or the processing speed for the processor or the other processor by a predetermined amount or percentage. Alternatively, the processor may decrease the power for the electronic device or the processing speed for the processor or the other processor by an amount or percentage determined based on a difference between the measured first temperature and the first predetermined temperature and/or a difference between the measured first temperature and the second predetermined temperature (e.g., a look-up table). In one example, the power for the electronic device and the processing speed for one or more heat generating components within the electronic device are decreased simultaneously based on the comparisons.

The processor may also increase the power for the electronic device and/or processing speeds for one or more heat generating components within the electronic device (e.g., the processor) based on the comparisons. For example, when the measured first temperature is less than the first predetermined temperature and the measured second temperature is less than the second predetermined temperature (and other monitored temperatures are below corresponding limits), the processor may increase the power for the electronic device and/or the processing speed for processor. The power for the electronic device and/or the processing speed for the processor may be increased by a predetermined percentage or amount. In one example, the power for the electronic device and/or the processing speed for the processor is increased based on differences between the measured first temperature and the first predetermined temperature, and the measured second temperature and the second predetermined temperature, respectively.

The first state identified in act 106 represents a state of the electronic device in which the user may contact at least portions of the first display and the first chassis, and/or the second display and the second chassis. For example, the PTO interface identified as being in the unlocked state indicates that the electronic device is open. Due to the user's ability to contact both the first display and the first chassis, and/or the second display and the second chassis, surface temperatures for the first display and the first chassis, and/or the second display and the second chassis, respectively, are used to control power to the electronic device and/or processing speed for heat generating components within the electronic device.

In act 110, the processor identifies if the electronic device is in a second state. The processor identifies the second state of the electronic device based on the signals generated by one or more of the state sensors and/or other sensors (e.g., a state sensor) and transmitted to the processor. The state sensor may identify any number of second states of the electronic device. For example, the state sensor identifies locking of the user interface, the rotational position of the second portion relative to the first portion of the electronic device and/or the rotational position of the first portion relative to the second portion of the electronic device, movement of the second portion relative to the first portion of the electronic device and/or movement of the first portion relative to the second portion of the electronic device (e.g., at a particular rate), the user touching a portion of the electronic device, other states of the electronic device, or any combination thereof.

In one example, identifying the second state of the electronic device includes identifying when the electronic device is closed. When the electronic device is closed, the first display abuts the second display, or the first chassis abuts the second chassis. In the closed position of the electronic device, the user is not able to contact the abutting surfaces of the electronic device (e.g., the abutting first display or second display or the abutting first chassis and second chassis).

Identifying when the electronic device is closed may be based on a state of, for example, the PTO interface. The PTO interface (e.g., a sensor within the PTO interface) may generate a signal when different portions of the PTO interface (e.g., at the first portion and the second portion of the electronic device, respectively) engage, placing the PTO interface within the locked position. The sensor within the PTO interface, for example, may be a touch sensor or another type of sensor that generates a signal identifying the PTO interface being placed in the unlocked position. The sensor within the PTO interface, for example, transmits the generated signal to the processor.

The processor may identify when the electronic device is closed in any number of other ways including, for example, based on an optical sensor. For example, the electronic device may include a camera and/or other optical sensors. The camera and/or the other optical sensors may generate a signal based on an amount of light the camera and/or the other optical sensors capture, and/or a distance between the first portion and the second portion of the electronic device determined based on analysis of image data generated by the camera and/or the other optical sensors. The processor may identify that the electronic device is closed when the amount of light captured by the camera and/or the other optical sensors is below a predetermine threshold. Other types of sensors may be used to determine when the electronic device is closed.

In one example, as part of the identification of the second state, the processor may identify in which closed orientation the electronic device is positioned (e.g., with abutting displays or abutting chassis). The processor may identify the closed orientation based on both the state of the PTO interface and the state of one or more other sensors (e.g., the optical sensor). For example, the processor may identify that the electronic device is closed based on the signal generated by the PTO interface and may determine the closed orientation based on the signal generated by the optical sensor. In other words, the processor knows the electronic device is closed based on the state of the PTO interface and knows whether the first display and the second display abut or the first chassis and the second chassis abut based on the amount of light the optical sensor captures.

Identifying the second state of the electronic device may include the processor determining when the monitored rotational position of the second portion relative to the first portion of the electronic device, for example, is equal to, or less than or equal to a second predetermined angle using the one or more rotational position sensors that may be used in act 106 to identify the first state. The second predetermined angle may be less than, equal to, or greater than the first predetermined angle. At a predetermined interval, the processor may compare the monitored rotational position of the second portion relative to the first portion of the electronic device to the second predetermined angle, and identify when the monitored rotational position of the second portion relative to the first portion of the electronic device is less than, or less than or equal to the second predetermined angle based on the comparison. In one example, the second predetermined angle is two degrees, and the processor identifies that the electronic device is in the second state when the monitored rotational position of the second portion relative to the first portion of the electronic device, for example, is less than two degrees. Other angles may be used for the second predetermined angle. For example, the second predetermined angle may be 355 degrees, and the processor may determine when the monitored rotational position of the second portion relative to the first portion of the electronic device is greater than, or greater than or equal to the second predetermined angle based.

In act 112, the processor controls the operation of the electronic device based on the first measured temperature but not based on the second measured temperature when the electronic device is in the identified second state. When the electronic device is identified as being in the second state, the processor turns off the second sensor, such that the second sensor no longer monitors the temperature at the second position, or the second sensor continues to monitor the temperature at the second position, but the processor no longer uses the second temperature in controlling the operation of the electronic device. Additional sensors may be ignored when the electronic device is in the identified second state. For example, a plurality of second sensors may be ignored when the electronic device is in the identified second state. The plurality of second sensors may be positioned at or adjacent to outer surfaces of the electronic device that abut each other when the electronic device is closed (e.g., located at or adjacent to the outer surface of the first display and the second display, or the first chassis and the second chassis).

When the second state is the electronic device being closed, the first sensor and the second are designated based on the orientation of the closed electronic device. For example, when the first display abuts the second display in a closed position of the electronic device, a sensor that is positioned at or adjacent to the first chassis or the second chassis is designated as the first sensor, and a sensor that is positioned at or adjacent to the first display or the second display is designated as the second sensor. When the first chassis abuts the second chassis in a closed position of the electronic device, a sensor that is positioned at or adjacent to the first display or the second display is designated as the first sensor, and a sensor that is positioned at or adjacent to the first chassis or the second chassis is designated as the second sensor.

As an example, the second state identified in act 112 is the electronic device being closed with the first chassis abutting the second chassis. The first position, at which the first temperature is measured, is at or adjacent to an outer surface of the first display or the second display. The second position, at which the second temperature is measured, is at or adjacent to an outer surface of the first chassis or the second chassis.

Additional, fewer, and/or different measured temperatures may be compared to corresponding predetermined temperatures. For example, the processor receives data representing monitored temperatures from a plurality of first sensors positioned at or adjacent to the first display and the second display, or the first chassis and the second chassis, and the processor compares the monitored temperatures to corresponding predetermined temperature limits. The processor may also receive temperatures measured by temperature sensors at positions at or adjacent to heat generating components (e.g., the processor) within the electronic device and/or temperatures measured by temperature sensors at positions within the electronic device but positioned away from the heat generating components. The processor may compare the received temperatures for positions within the electronic device, respectively, and compare the received temperatures with the corresponding predetermined temperatures.

Controlling the operation of the electronic device when the electronic device is in the identified second state includes the processor decreasing the power for the electronic device or decreasing a processing speed for the processor or another processor based on the comparison. For example, controlling the operation of the electronic device when the electronic device is in the identified second state includes the processor decreasing the power for the electronic device or decreasing the processing speed for the processor or the other processor when the measured first temperature is greater than, or greater than or equal to the first predetermined temperature. The processor may decrease the power for the electronic device or the processing speed for the processor or the other processor by a predetermined amount or percentage. Alternatively, the processor may decrease the power for the electronic device or the processing speed for the processor or the other processor by an amount or percentage determined based on a difference between the measured first temperature and the first predetermined temperature. In one example, the power for the electronic device and the processing speed for one or more heat generating components within the electronic device are decreased simultaneously based on the comparison.

The processor may also increase the power for the electronic device and/or processing speeds for one or more heat generating components within the electronic device (e.g., the processor) based on the comparison. For example, when the measured first temperature is less than the first predetermined temperature (and other monitored temperatures are below corresponding limits), the processor may increase the power for the electronic device and/or the processing speed for processor. The power for the electronic device and/or the processing speed for the processor may be increased by a predetermined percentage or amount. In one example, the power for the electronic device and/or the processing speed for the processor is increased based on a difference between the measured first temperature and the first predetermined temperature.

The second state identified in act 110 represents a state of the electronic device in which the user may contact at least portions of the first display and the second display but not the first chassis and the second chassis, or may contact at least portions of the first chassis and the second chassis but not the first display and the second display. For example, the PTO interface identified as being in the locked state combined with the optical sensor capturing an amount of light above a predetermined threshold indicates that the electronic device is closed, with the first chassis abutting the second chassis. Due to the user's inability to contact the first chassis and the second chassis, surface temperatures for the first chassis and the second chassis, respectively, are not used to control power to the electronic device and/or processing speed for heat generating components within the electronic device. The surface temperatures for the first chassis and the second chassis, for example, are allowed to rise above the usual temperature limits set for user safety since the user is not able to contact the first chassis or the second chassis when the electronic device is closed with the first chassis abutting the second chassis. With the surface temperatures for the first chassis and the second chassis, for example, being allowed to rise above the respective temperature limits, the electronic device may operate at a higher power, heat generating components of the electronic device (e.g., the processor) may be able to operate at higher processing speeds, or a combination thereof when the electronic device is closed (e.g., with the first chassis abutting the second chassis). When the electronic device is closed, the cooling capability of the electronic device is limited due to lack of surface for cooling. Additional cooling may be provided for electronic device performance and to improve user experience.

Some or all of the acts of the method 100 may be repeated during operation of the computing device 100. For example, while the first temperature and the second temperature are measured continuously or at a predetermined interval, acts 106-112 may be repeated at a predetermined interval or with each measurement of the first temperature and the second temperature.

Figure 2:
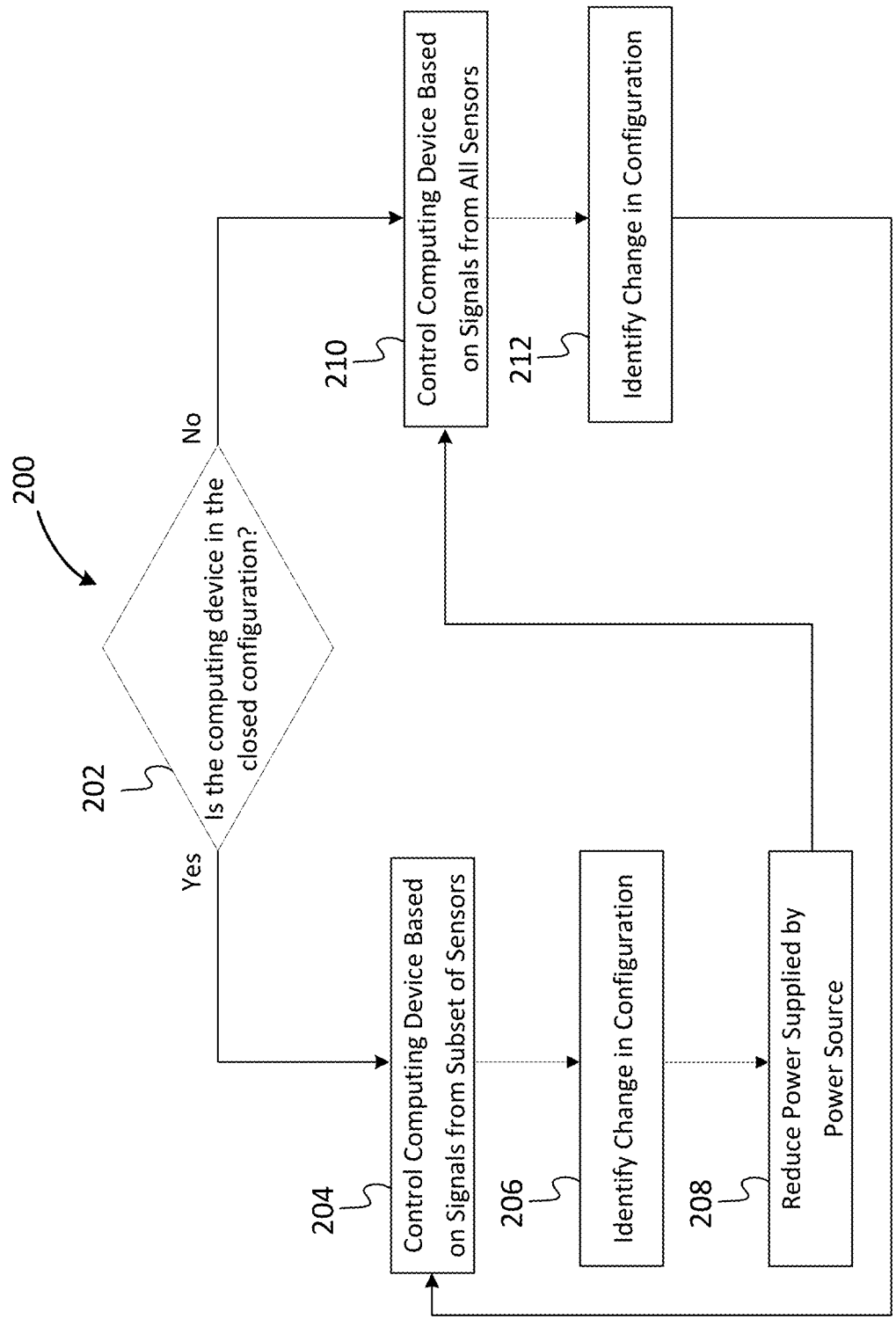
FIG. 2 is a flow diagram of a method for cooling an electronic device in accordance with another example.

FIG. 2 shows a flowchart of one example of a method 200 for cooling a computing device. The computing device may be a computing device shown in FIGS. 3-7, or may be another computing device. For example, the computing device includes a first portion and a second portion rotatable relative to each other. The first portion includes a first display and a first chassis, and the second portion includes a second display and a second chassis. The method 200 is implemented in the order shown, but other orders may be used. Additional, different, or fewer acts may be provided. Similar methods may be used for cooling an electronic device.

In act 202, a processor identifies a configuration of the computing device. The configuration of the computing device identified by the processor may be any number of configurations including, for example, an open configuration or a closed configuration of the computing device. In one example, in act 202, the processor determines if the computing device is in the closed configuration.

In the closed configuration, the second portion of the computing device is at a predetermined angle relative to the first portion of the computing device, the second portion of the computing device is at an angle less than the predetermined angle relative to the first portion of the computing device, or the second portion of the computing device is at an angle within a predetermined range relative to the first portion of the computing device. For example, in the closed configuration, the second portion of the computing device is at a zero degree angle relative to the first portion of the computing device, plus or minus five degrees.

In the open configuration, the second portion of the computing device is at a predetermined angle relative to the first portion of the computing device, the second portion of the computing device is at an angle greater than the predetermined angle relative to the first portion of the computing device, or the second portion of the computing device is at an angle within a predetermined range relative to the first portion of the computing device. For example, in the open configuration, the second portion of the computing device is at a 180 degree angle relative to the first portion of the computing device, plus or minus five degrees.

The processor identifies the configuration of the computing device based on signals from one or more sensors within and/or on the computing device. The one or more sensors may include any number of different types of sensors including, for example, a sensor of a PTO mechanism, an optical sensor, a touch sensor, a Hall-effect sensor, a gyroscope sensor, a shaft angle transducer, another type of sensor, or any combination thereof.

The computing device also includes temperature sensors positioned within and/or on the computing device. For example, the computing device may include a first group of temperature sensors that measure temperatures at positions at or adjacent to outer surfaces of the computing device, respectively. For example, the first group of temperature sensors may include temperature sensors that measure temperatures at positions at or adjacent to outer surfaces of, for example, the first display, the first chassis, the second display, and the second chassis, respectively. The computing device may also include a second group of temperature sensors that measure temperatures at positions within the computing device, respectively. The second group of temperature sensors may measure temperatures at positions at or adjacent to heat generating components within the computing device, at positions away from the heat generating components within the computing device (e.g., at or adjacent to thermal management devices such as heat pipes or heat sinks), or a combination thereof.

Based on the configuration identified in act 202, the method moves to act 204 or act 210. For example, if the computing device is in the closed configuration, the method 200 moves to act 204. In act 204, the processor controls the computing device based on signals generated by a subset of temperature sensors of the first group of temperature sensors. For example, when the computing device is in the closed configuration, the computing device includes a hot side and a cold side. The hot side may include sides of the first portion and the second portion that abut in the closed configuration. For example, when the first chassis and the second chassis abut, the hot side includes outer surfaces of the first chassis and the second chassis and the cold side includes outer surfaces of the first display and the second display. The hot side may be hotter than the cold side due to the inability of the hot side to cool via convective, conductive, and/or radiative heat transfer out of the computing device.

In one example, the processor receives signals from all temperature sensors of the first group of temperature sensors but only uses a first subset of the first group of temperature sensors. In other words, the processor ignores signals from a second subset of temperature sensors of the first group of temperature sensors when the computing device is in the closed configuration. In another example, the processor turns off the second subset of the first group of temperature sensors, such that the second subset of the first group of temperature sensors do not measure the temperatures at the corresponding positions.

When the computing device is in the closed configuration, the first subset of the first group of temperature sensors corresponds to the temperature sensors at or adjacent to the cold side of the computing device and the second subset of the first group of temperature sensors corresponds to the temperature sensors at or adjacent to the hot side of the computing device. In other words, with respect to the first group of sensors, the processor only uses signals (e.g., representing measured temperatures) from temperature sensors at or adjacent to the cold side of the computing device when the computing device is in the closed configuration.

The processor compares the measured temperatures from the temperature sensors at or adjacent to the cold side of the computing device to corresponding predetermined first temperature limits. The predetermined first temperature limits are set, for example, for the safety of a user of the computing device (e.g., to prevent burns). The processor may also compare measured temperatures from at least some of the temperature sensors of the second group of temperature sensors (e.g., within the computing device) to corresponding predetermined second temperature limits. A predetermined second temperature limit may represent, for example, a temperature at which performance of the corresponding heat generating component greatly degrades or the corresponding heat generating component fails.

The processor may increase or decrease power supplied by a power source of the computing device based on the comparisons. For example, if all of the measured temperatures are below the corresponding temperature limits, the processor may increase the power supplied by the power source. If at least one of the measured temperatures is above the corresponding temperature limits, the processor may decrease the power supplied by the power source.

By ignoring the hot side temperature sensors or turning off the hot side temperature sensors, temperatures at the hot side (e.g., the abutting first chassis and second chassis) are allowed to rise above usual temperature limits (e.g., to prevent burning the user). Since the user is not able to contact the hot side in the closed configuration, the higher temperatures will not harm the user. If, for example, the hot side temperatures are ignored when controlling the computing device, cooling for the computing device may be improved. In one example, the cooling capability for the computing device is improved by 14%, and the computing device may operate at 5.0 Watts (e.g., when the computing device is in the closed configuration with the hot side temperatures being ignored) instead of 4.3 Watts (e.g., when the computing device is in the closed configuration with temperatures from all temperature sensors being used). Safety requirements are still met.

In act 206, the processor identifies a change in the configuration identified in act 202. For example, the computing device includes a PTO mechanism, and a sensor of the PTO mechanism determines a change in the PTO mechanism. The sensor of the PTO mechanism generates a signal representing the change and transmits the signal to the processor. The computing device may include additional and/or different sensors (e.g., optical sensors or gyroscope sensors) configured to determine the change in the configuration of the computing device.

As an example, in act 206, the sensor of the PTO mechanism determines that the PTO mechanism has moved from a locked position corresponding to the closed configuration of the computing device, to an unlocked position. The processor may infer that the computing device is transitioning from the closed configuration of the computing device to the open configuration of the computing device based on the change of the PTO mechanism from the locked position to the unlocked position.

In act 208, the processor reduces the power supplied by the power source immediately after the change is identified in act 206. The processor may reduce the power supplied by the power source by a predetermined amount or percentage. For example, the processor may reduce the power supplied by the power source by 10% immediately after the change is identified in act 206. Other percentages or amounts may be used.

In act 210, which follows act 202 when the open configuration is identified in act 202 and follows act 208, the processor controls the computing device based on signals generated by all temperature sensors of the first group of temperature sensors. With respect to the first group of sensors, the processor uses signals (e.g., representing measured temperatures) from temperature sensors at or adjacent to both sides of the computing device when the computing device is in the open configuration. For example, the processor uses signals from temperature sensors at or adjacent to outer surfaces of the first display, the first chassis, the second display, and the second chassis.

The processor compares the measured temperatures from the first group of temperature sensors to the corresponding predetermined first temperature limits. The processor may also compare measured temperatures from at least some of the temperature sensors of the second group of temperature sensors (e.g., within the computing device) to the corresponding predetermined second temperature limits.

The processor may increase or decrease the power supplied by the power source of the computing device based on the comparisons. For example, if all of the measured temperatures are below the corresponding temperature limits, the processor may increase the power supplied by the power source. If at least one of the measured temperatures is above the corresponding temperature limits, the processor may decrease the power supplied by the power source.

In act 212, the processor identifies a change in the configuration identified in act 202 or act 206. For example, the sensor of the PTO mechanism determines a change in the PTO mechanism. The sensor of the PTO mechanism generates a signal representing the change and transmits the signal to the processor. The computing device may include additional and/or different sensors (e.g., optical sensors or gyroscope sensors) configured to determine the change in the configuration of the computing device.

As an example, in act 212, the sensor of the PTO mechanism determines that the PTO mechanism has moved from the unlocked position corresponding to the open configuration of the computing device, to the locked position corresponding to the closed configuration of the computing device. One or more sensors of the computing device may determine in which closed configuration the computing device is positioned.

The method then moves back to act 214, in which the processor controls the computing device based on signals generated by the first subset of temperature sensors of the first group of temperature sensors, which correspond to the temperature sensors at or adjacent to the cold side of the computing device, but not signals generated by the second subset of temperature sensors of the first group of temperature sensors, which correspond to the temperature sensors at or adjacent to the hot side of the computing device. In other words, with respect to the first group of sensors, the processor only uses signals (e.g., representing measured temperatures) from temperature sensors at or adjacent to the cold side of the computing device when the computing device is in the closed configuration.

The examples of the methods described with reference to FIGS. 1 and 2 may help optimize thermal management in electronic devices. Optimal thermal management may provide an increase in system performance, an increase in system and/or device life expectancy, and an improved financial margin.

Figure 3:
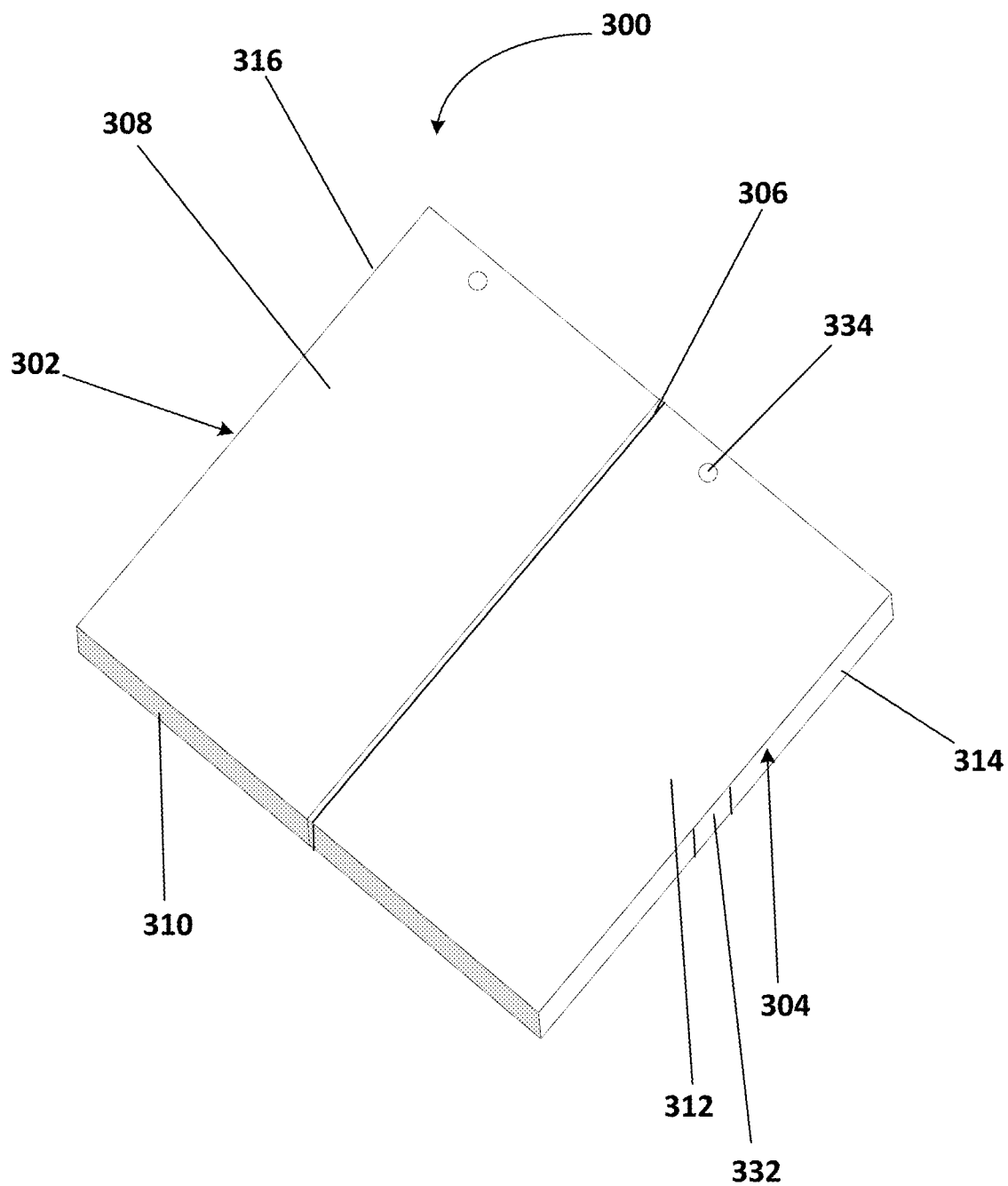
FIG. 3 depicts a perspective view of an example of a computing device in an open configuration.
Figure 4:
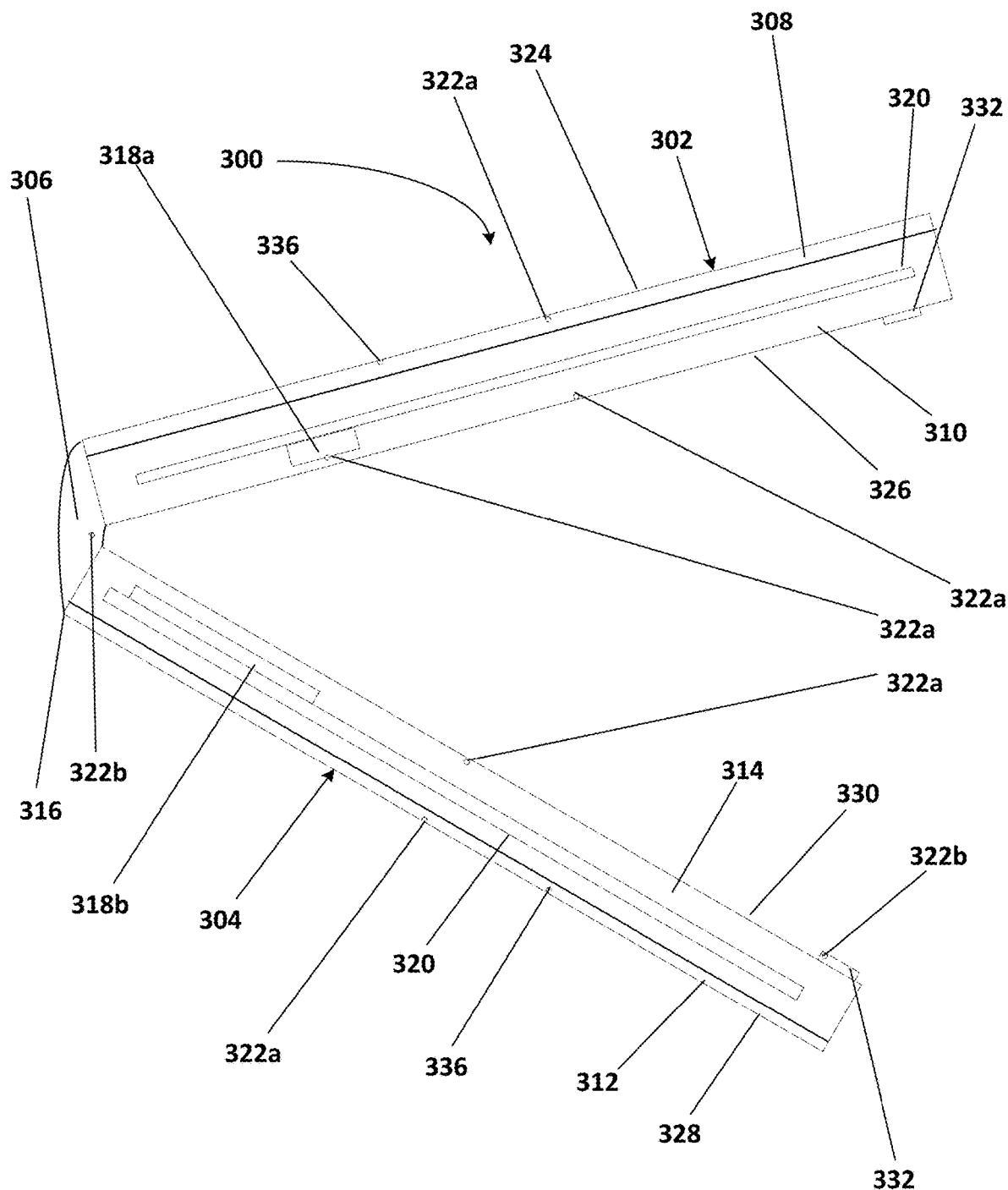
FIG. 4 depicts a side view of an example of a computing device in a transition configuration, with a side removed.
Figure 5:
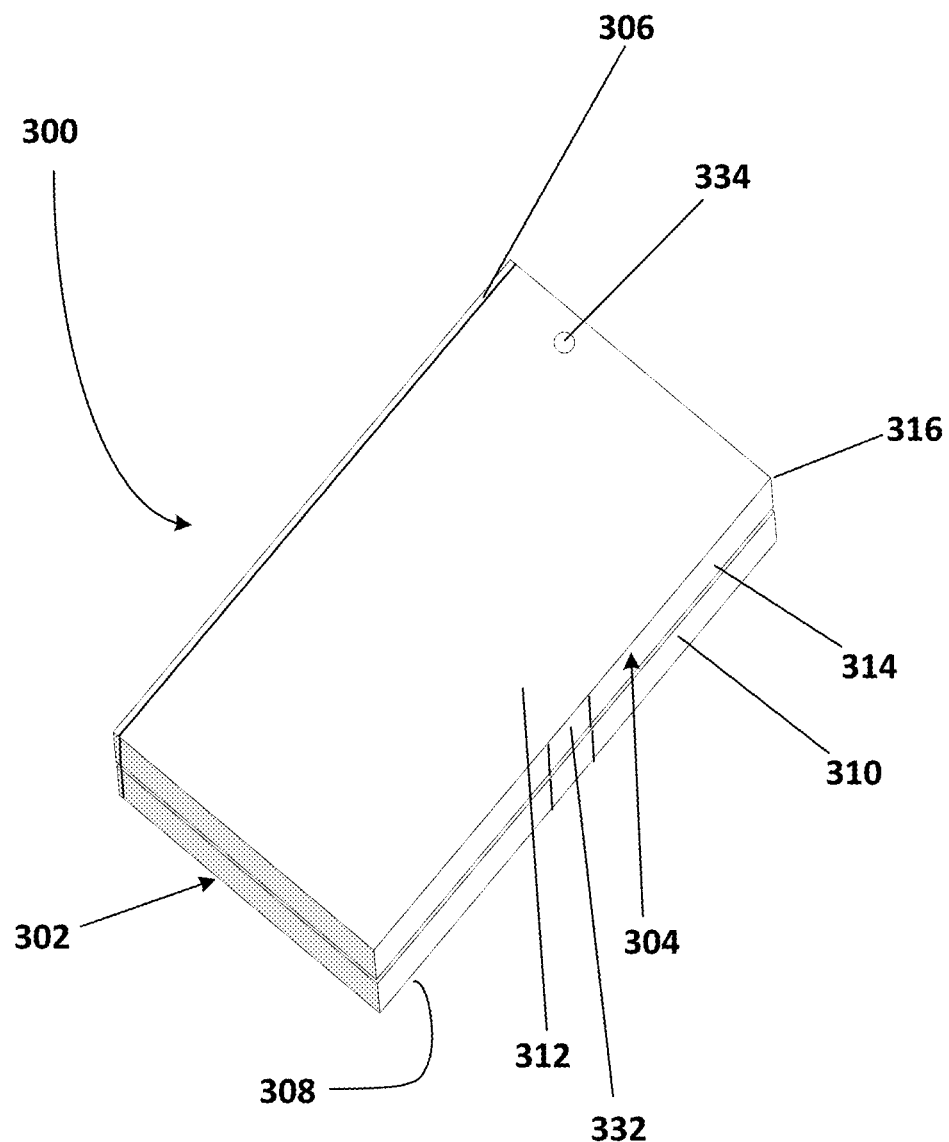
FIG. 5 depicts a perspective view of an example of a computing device in a closed configuration.

FIGS. 3-5 illustrate examples of a computing device 300 to which the method 100, the method 200, another thermal management control method, or any combination thereof may be applied. In FIG. 3, the computing device 300 is in an open configuration. In FIG. 4, the computing device 300 is in a transition configuration (e.g., between the open configuration and a closed configuration). In FIG. 5, the computing device 300 is in the closed configuration.

The computing device 300 may be any number of computing devices including, for example, a personal computer, a server computer, a tablet or other handheld computing device, a laptop or mobile computer, a communications device such as a mobile phone, a multiprocessor system, a microprocessor-based system, a set top box, a programmable consumer electronic device, a network PC, a minicomputer, a mainframe computer, or an audio and/or video media player.

For example, the computing device 300 is a multi-screen computing device such as a multi-screen mobile device. The computing device 300 includes a first portion 302 and a second portion 304 rotatably attached to the first portion 302 via a hinge 306. The first portion 302 includes a first display 308 and a first chassis 310 connected to (e.g., supporting) the first display 308. The second portion 304 includes a second display 312 and a second chassis 314 connected to (e.g., supporting) the second display 312.

As shown in FIG. 4, the computing device 300 includes a housing 316 (e.g., a first portion of the housing 316 corresponding to the first portion 302 and a second portion of the housing 316 corresponding to the second portion 304) that supports one or more heat generating components 318 (e.g., a first heat generating component 318a supported in the first portion 302 and a second heat generating component 318b supported in the second portion 304). The first heat generating component 318a and the second heat generating component 318b may be any number of electrically powered devices including, for example, a processor, a graphics card, memory (e.g., a double data rate synchronous dynamic random-access memory (DDR SDRAM), a power supply, a hard drive (e.g., a solid state drive (SSD)), RF hardware, a socket, or another electrically powered device. For example, the first heat generating component 318a is a processor (e.g., a CPU), and the second heat generating component 318b is a power supply (e.g., a battery). The first heat generating component 318a and/or the second heat generating component 318b may be supported by the housing 316 via, for example, respective printed circuit boards (PCBs) 320 attached to and/or supported by the housing 316. The processor 318a and the power supply 318b, for example, are in communication with each other and/or other electrical devices or components of the computing device 300 via the PCBs 320 and/or cabling and connectors. The computing device 300 may include any number of additional components not shown in FIG. 1 (e.g., a hard drive, connectors, memory).

The computing device 300 also includes a plurality of sensors 322. The plurality of sensors 322 may include any number of different types of sensors including, for example, temperature sensors, one or more sensors of a PTO mechanism, optical sensors, a touch sensors, Hall-effect sensors, gyroscope sensors, shaft angle transducers, other types of sensors, or combinations thereof. The plurality of sensors 322 generate data and transmit the data to, for example, the processor 318 via wired connections and/or wireless connections.

The housing 316 has a first outer surface 324, a second outer surface 326, a third outer surface 328, and a fourth outer surface 330. The first outer surface 324 is, for example, an outer surface of the first display 308, and the second outer surface 326 is, for example, an outer surface of the first chassis 310. The third outer surface 328 is, for example, an outer surface of the second display 312, and the fourth outer surface 330 is, for example, an outer surface of the second chassis 314.

A plurality of temperature sensors 322a are positioned at or adjacent to the first outer surface 324, the second outer surface 326, the third outer surface 328, and the fourth outer surface 330, respectively. Other temperature sensors 322a may be positioned within the computing device 300 (e.g., at or adjacent to the one or more heat generating components 318). The plurality of temperature sensors 322a monitor temperatures at the corresponding positions on or in the computing device 300. The plurality of temperature sensors 322a generate data (e.g., signals) representative of the monitored temperatures and transmit the data to one of the heat generating components 318 (e.g., the processor 318a).

One or more state sensors 322b are positioned on or in the computing device 300. For example, the computing device includes a PTO mechanism 332 that allows rotational motion of the first portion 302 and the second portion 304 relative to each other via the hinge 306 when the PTO mechanism 332 is in an unlocked position, and prevents rotational motion of the first portion 302 and the second portion 304 relative to each other via the hinge 306 when the PTO mechanism 332 is in a locked position. The PTO mechanism 332 includes one or more state sensors 322b that identify a state of the PTO mechanism 332 (e.g., the unlocked position or the locked position). Additional and/or different state sensors 322b may be positioned on or in the computing device 300. For example, the computing device may include an optical sensor 334 (e.g., a camera; see FIG. 3) and a plurality of touch sensors 336. Other state sensors 322b such as, for example, Hall-effect sensors, gyroscope sensors, shaft angle transducers, other types of sensors, or any combination thereof may be included in the computing device 300.

The one or more state sensors 322b monitor respective states of the computing device 300. For example, the one or more state sensors 322b monitor the state of the PTO mechanism 332, a rotational position of the second portion 304 relative to the first portion 302 and/or a rotational position of the first portion 302 relative to the second portion 304, contact by a user on an outer surface of the computing device 300, motion of the computing device 300, other states of the computing device 300, or any combination thereof. The one or more state sensors 322b generate data (e.g., signals) representative of the monitored states and transmit the data representing the monitored states to one of the heat generating components 318 (e.g., the processor 318a).

The processor 318a or another processor may execute the method 100, the method 200, or another method for controlling the computing device 300 (e.g., a power supplied by the power supply 318b and/or a processing speed of the processor 318a or the other processor) based on the data received from the plurality of temperature sensors 318a and the one or more state sensors 318b. In one example, the processor 318a or the other processor controls the computing device 300 based on data from touch sensors. For example, based on user contact points on the computing device determined by the touch sensors, one or more temperature sensors may be ignored when controlling the computing device 300 for thermal management purposes.

The computing device 300 may include any number of other components. For example, the computing device 300 may include one or more thermal management devices to aid in the heat removal from the computing device 300. For example, the computing device 300 may include heat spreaders, phase change devices (e.g., one or more heat pipes and/or vapor chambers), heat sinks, fans, other thermal management devices, or any combination thereof.

Figure 6:
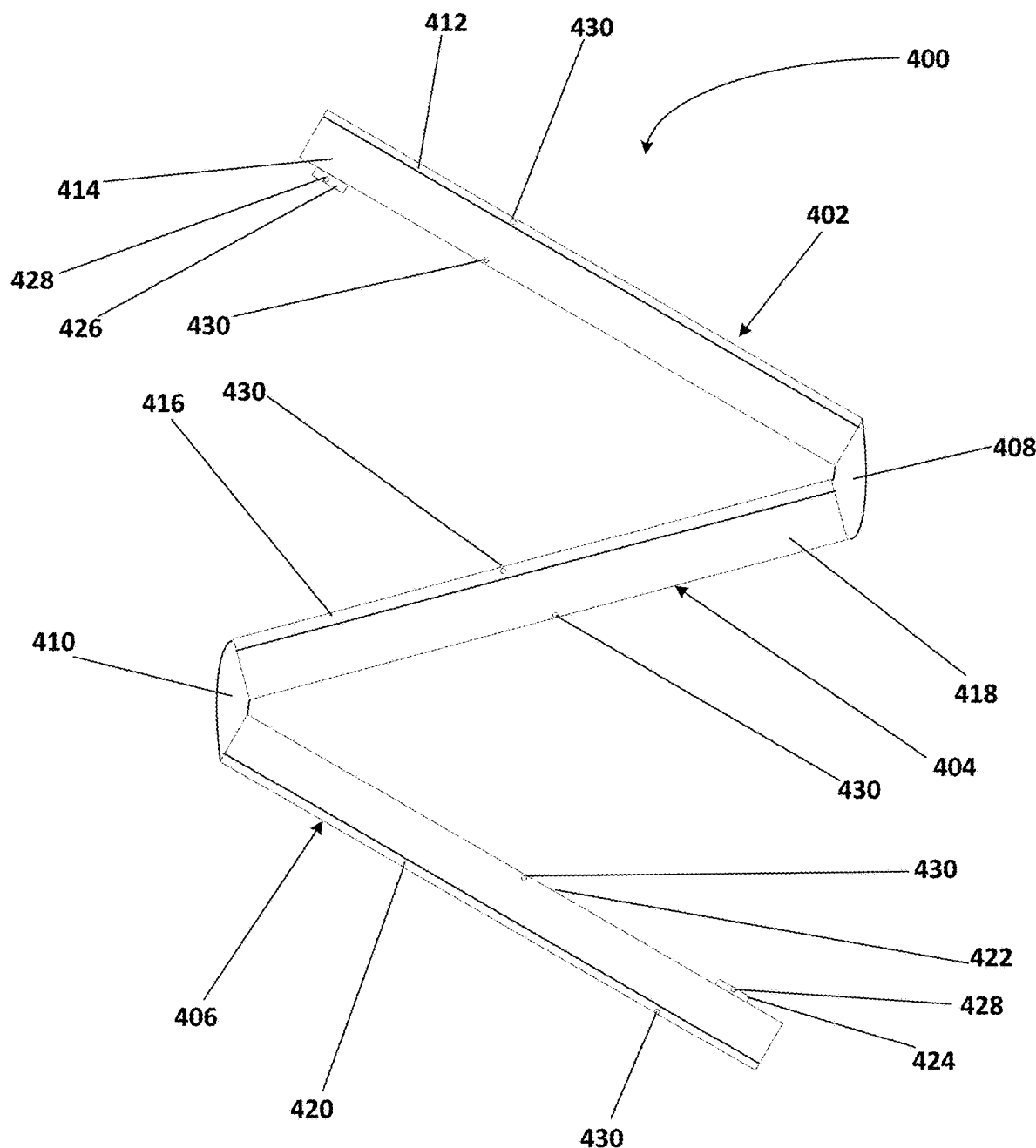
FIG. 6 depicts a side view of another example of a computing device in a transition configuration.

FIG. 6 shows another example of a computing device 400 to which the method 100, the method 200, another thermal management control method, or any combination thereof may be applied. The computing device 400 is a multi-screen device with three displays. The computing device 400 includes a first portion 402, a second portion 404, and a third portion 406. The first portion 402 and the second portion 404 are rotatable relative to each other via a first hinge 408, and the second portion 404 and the third portion 406 are rotatable relative to each other via a second hinge 410.

The first portion 402 includes a first display 412 connected to (e.g., supported by) a first chassis 414, the second portion 404 includes a second display 416 connected to (e.g., supported by) a second chassis 418, and the third portion 406 includes a third display 420 connected to (e.g., supported by) a third chassis 422. Other computing devices may include more displays and/or portions.

One or more processors (e.g., a processor) of the computing device 400 may execute portions of the method 100, the method 200, and/or other thermal management control methods. For example, the processor of the computing device 400 may execute the method 100 or the method 200 with respect to the first portion 402 and the second portion 404, and may execute the method 100 or the method 200 with respect to the second portion 404 and the third portion based on data from temperature sensors and state sensors of the computing device 400. The performance of the method 100 or the method 200, for example, for the first portion 402 and the second portion 404, and the performance of the method 100 or the method 200, for example, for the second portion 402 and the third portion 406 may be done in parallel.

In one example, the computing device 400 includes a first PTO mechanism 424 and a second PTO mechanism 426 and corresponding state sensors 428 associated with the first PTO mechanism 424 and second PTO mechanism 426, respectively. The first PTO mechanism 424, in the locked state, prevents or restricts rotation of the first portion 402 and the second portion 404 relative to each other. The second PTO mechanism 426, in the locked state, prevents or restricts rotation of the second portion 402 and the third portion 406 relative to each other. The computing device 400 also includes temperature sensors 430 positioned on and in the computing device 400. For example, the computing device 400 includes temperature sensors 430 positioned at or adjacent to the first display 412, the first chassis 414, the second display 416, the second chassis 418, the third display 420, and the third chassis 422, respectively. The state sensors 428 and the temperature sensors 430 generate data and transmit the generated data to the processor of the computing device 400 for execution of, for example, the method 100 or the method 200.

Figure 7:
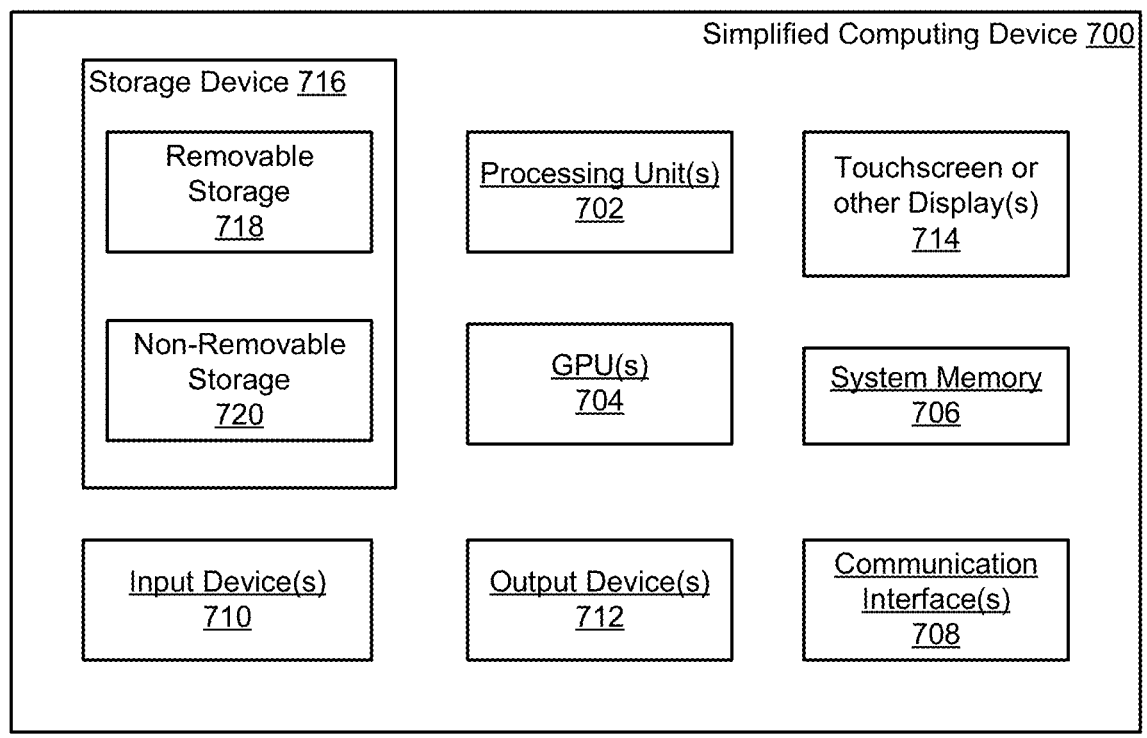
FIG. 7 is a block diagram of a computing environment in accordance with one example for implementation of the disclosed methods or one or more electronic devices.

With reference to FIG. 7, a thermal management system, as described above, may be incorporated within an exemplary computing environment 700. The computing environment 700 may correspond with one of a wide variety of computing devices, including, but not limited to, personal computers (PCs), server computers, tablet and other hand-held computing devices, laptop or mobile computers, communications devices such as mobile phones, multiprocessor systems, microprocessor-based systems, set top boxes, programmable consumer electronics, network PCs, minicomputers, mainframe computers, or audio or video media players. For example, the heat dissipating apparatus is incorporated within a computing environment having an active cooling source (e.g., fans).

The computing environment 700 has sufficient computational capability and system memory to enable basic computational operations. In this example, the computing environment 700 includes one or more processing units 702, which may be individually or collectively referred to herein as a processor. The computing environment 700 may also include one or more graphics processing units (GPUs) 704. The processor 702 and/or the GPU 704 may include integrated memory and/or be in communication with system memory 706. The processor 702 and/or the GPU 704 may be a specialized microprocessor, such as a digital signal processor (DSP), a very long instruction word (VLIW) processor, or other microcontroller, or may be a general purpose central processing unit (CPU) having one or more processing cores. The processor 702, the GPU 704, the system memory 706, and/or any other components of the computing environment 700 may be packaged or otherwise integrated as a system on a chip (SoC), application-specific integrated circuit (ASIC), or other integrated circuit or system.

The computing environment 700 may also include other components, such as, for example, a communications interface 708. One or more computer input devices 710 (e.g., pointing devices, keyboards, audio input devices, video input devices, haptic input devices, or devices for receiving wired or wireless data transmissions) may be provided. The input devices 710 may include one or more touch-sensitive surfaces, such as track pads. Various output devices 712, including touchscreen or touch-sensitive display(s) 714, may also be provided. The output devices 712 may include a variety of different audio output devices, video output devices, and/or devices for transmitting wired or wireless data transmissions.

The computing environment 700 may also include a variety of computer readable media for storage of information such as computer-readable or computer-executable instructions, data structures, program modules, or other data. Computer readable media may be any available media accessible via storage devices 716 and includes both volatile and nonvolatile media, whether in removable storage 718 and/or non-removable storage 720. Computer readable media may include computer storage media and communication media. Computer storage media may include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the processing units of the computing environment 700.

While the present claim scope has been described with reference to specific examples, which are intended to be illustrative only and not to be limiting of the claim scope, it will be apparent to those of ordinary skill in the art that changes, additions and/or deletions may be made to the disclosed embodiments without departing from the spirit and scope of the claims.

The foregoing description is given for clearness of understanding only, and no unnecessary limitations should be understood therefrom, as modifications within the scope of the claims may be apparent to those having ordinary skill in the art.

In a first embodiment, a method for cooling an electronic device is provided. The electronic device includes a first portion and a second portion. The first portion and the second portion are rotatable relative to each other. The method includes measuring, by a first sensor, a first temperature at a first location within or on the electronic device continuously or intermittently and measuring, by a second sensor, a second temperature at a second location within or on the electronic device continuously or intermittently. The method also includes identifying, by a processor, a first state of the electronic device or a second state of the electronic device. The method also includes controlling, by the processor, operation of the electronic device based on the first measured temperatures and the second measured temperatures when the electronic device is in the identified first state and controlling, by the processor, the operation of the electronic device based on the first measured temperatures but not based on the second measured temperatures when the electronic device is in the identified second state.

In a second embodiment, with reference to the first embodiment, controlling the operation of the electronic device when the electronic device is in the identified first state includes decreasing, by the processor, power for the electronic device when the first state is identified, and comparing, by the processor, the measured first temperature to a first predetermined temperature and the measured second temperature to a second predetermined temperature. Controlling the operation of the electronic device when the electronic device is in the identified first state also includes decreasing, by the processor, the power for the electronic device or decreasing a processing speed for the processor or another processor when the measured first temperature is greater than, or greater than or equal to the first predetermined temperature or when the measured second temperature is greater than, or greater than or equal to the second predetermined temperature. Controlling the operation of the electronic device when the electronic device is in the identified second state includes comparing, by the processor, the measured first temperature to the first predetermined temperature, and decreasing, by the processor, the power for the electronic device or decreasing the processing speed for the processor or the other processor when the measured first temperature is greater than, or greater than or equal to the first predetermined temperature.

In a third embodiment, with reference to the second embodiment, decreasing the power for the electronic device when the first state is identified includes decreasing the power for the electronic device by a predetermined percentage.

In a fourth embodiment, with reference to the first embodiment, the first portion of the electronic device includes a first display and a first chassis opposite the first display, and the second portion of the electronic device includes a second display and a second chassis opposite the second display. The first portion and the second portion are rotatable relative to each other via a hinge. The first location within or on the electronic device is at or adjacent to one of the first display and the first chassis, and the second location within or on the electronic device is at or adjacent to the other of the first display and the first chassis. Identifying the first state of the electronic device includes identifying when the electronic device is open, and identifying the second state of the electronic device includes identifying when the electronic device is closed. The first display abuts the second display or the first chassis abuts the second chassis when the electronic device is closed.

In a fifth embodiment, with reference to the fourth embodiment, identifying when the electronic device is closed includes identifying when the electronic device is closed based on a state of a user interface.

In a sixth embodiment, with reference to the fifth embodiment, identifying when the electronic device is closed based on a state of a user interface includes identifying when the electronic device is closed based on a state of a locking mechanism of the electronic device.

In a seventh embodiment, with reference to the fourth embodiment, identifying when the electronic device is open includes identifying when the electronic device is open based on an optical sensor.

In an eighth embodiment, with reference to the first embodiment, the method further includes determining an angular position of the second portion of the electronic device relative to the first portion of the electronic device continuously or intermittently. Identifying the first state of the electronic device includes determining when the determined angular position of the second portion relative to the first portion is equal to, or greater than or equal to a first predetermined angle. Identifying the second state of the electronic device includes determining when the determined angular position of the second portion relative to the first portion is less than or equal to, or equal to a second predetermined angle.

In a ninth embodiment, with reference to the eighth embodiment, the first predetermined angle and the second predetermined angle are zero degrees, respectively.

In a tenth embodiment, with reference to the eighth embodiment, determining the rotational position of the second portion of the electronic device relative to the first portion of the electronic device includes determining the rotational position of the second portion of the electronic device relative to the first portion of the electronic device with an optical sensor, a touch sensor, a Hall-effect sensor, a gyroscope sensor, a shaft angle transducer, or any combination thereof.

In an eleventh embodiment, with reference to the first embodiment, the method further includes identifying motion of the first portion relative to the second portion, motion of the second portion relative to the first portion, or motion of the first portion and the second portion relative to each other. Identifying the first state of the electronic device includes identifying the first state of the electronic device based on the identified motion. Identifying the second state of the electronic device includes identifying the second state of the electronic device based on the identified motion.

In a twelfth embodiment, a computing device includes a first portion and a second portion rotatably attached to the first portion. The first portion includes a first display and a first chassis. The second portion includes a second display and a second chassis. The computing device also includes a first sensor at a first position. The first position is at or adjacent to an outer surface of the first display or the second display. The first sensor is configured to measure a temperature at the first position continuously or intermittently. The computing device includes a second sensor at a second position. The second position is at or adjacent to an outer surface of the first chassis or the second chassis. The second sensor is configured to measure a temperature at the second position continuously or intermittently. The computing device includes a processor supported within the first portion, the second portion, or the first portion and the second portion. The processor is configured to identify when the computing device is in a first state and control operation of the computing device based on the measured temperature at the first position and the measured temperature at the second position when the first state of the computing device is identified. The processor is further configured to identify when the computing device is in a second state, and control the operation of the computing device based on the measured temperature at the first position but not based on the measured temperature at the second position when the second state of the computing device is identified.

In a thirteenth embodiment, with reference to the twelfth embodiment, the second state is a closed position. The first chassis abuts the second chassis in the closed position.

In a fourteenth embodiment, with reference to the twelfth embodiment, the computing device further includes a third portion rotatably attached to the second portion. The third portion includes a third display and a third chassis. The computing device also includes a third sensor at a third position. The third position is at or adjacent to an outer surface of the third display. The third sensor is configured to measure a temperature at the third position continuously or intermittently. The computing device includes a fourth sensor at a fourth position. The fourth position is at or adjacent to an outer surface of the third chassis. The fourth sensor is configured to measure a temperature at the fourth position continuously or intermittently. The processor is further configured to identify when the computing device is in a third state and control operation of the computing device based on the measured temperature at the third position and the measured temperature at the fourth position when the third state of the computing device is identified. The processor is further configured to identify when the computing device is in a fourth state and control the operation of the computing device based on the measured temperature at the third position but not based on the measured temperature at the fourth position when the fourth state of the computing device is identified.

In a fifteenth embodiment, with reference to the twelfth embodiment, the computing device further includes a user interface and a third sensor configured to identify a state of the user interface. The identification of the computing device being in the first state includes identification of the computing device being in the first state based on the identified state of the user interface.

In a sixteenth embodiment, with reference to the fifteenth embodiment, the user interface includes a locking mechanism operable to prevent or resist rotational movement of the first portion relative to the second portion.

In a seventeenth embodiment, with reference to the twelfth embodiment, the computing device further includes a power source configured to supply power. The control of the operation of the computing device when the first state of the computing device is identified includes decrease of the power supplied by the power source when the first state is identified and comparison, when the computing device is in the identified first state, of the measured temperature at the first position to a first predetermined temperature. The control of the operation of the computing device when the first state of the computing device is identified also includes comparison, when the computing device is in the identified first state, of the measured temperature at the second position to a second predetermined temperature and decrease of the power supplied by the power source or decrease of a processing speed for the processor or another processor within the computing device when the measured temperature at the first position is greater than, or greater than or equal to the first predetermined temperature or when the measured temperature at the second position is greater than, or greater than or equal to the second predetermined temperature.

In an eighteenth embodiment, with reference to the seventeenth embodiment, the decrease of the power supplied by the power source includes decrease of the power supplied by the power source by a predetermined percentage.

In a nineteenth embodiment, with reference to the twelfth embodiment, the computing device further includes a third sensor configured to determine an angular position of the second portion of the computing device relative to the first portion of the computing device continuously or intermittently. The third sensor includes an optical sensor, a Hall-effect sensor, a gyroscope sensor, a shaft angle transducer, or any combination thereof. The identification of when the computing device is in the first state includes comparison of the determined angular position to a first predetermined angle and identification of the computing device being in the first state based on the comparison of the determined angular position to the first predetermined angle. The determined angular position of the second portion relative to the first portion is equal to, or greater than or equal to the first predetermined angle in the first state. The identification of when the computing device is in the second state includes comparison of the determined angular position to a second predetermined angle and identification of the computing device being in the second state based on the comparison of the determined angular position to the second predetermined angle. The determined angular position of the second portion relative to the first portion is less than, or less than or equal to the second predetermined angle in the second state.

In a twentieth embodiment, a non-transitory computer-readable storage medium that stores instructions executable by one or more processors to cool an electronic device is provided. The electronic device includes a first portion and a second portion rotatably attached to the first portion. The first portion includes a first display and a first chassis. The second portion includes a second display and a second chassis. The instructions include identifying a temperature at a first position. The first position is at or adjacent to an outer surface of the first display or the second display. The instructions also include identifying a temperature at a second position. The second position is at or adjacent to an outer surface of the first chassis or the second chassis. The instructions include identifying when the electronic device is in a first state and controlling operation of the electronic device based on the identified temperature at the first position and the identified temperature at the second position when the first state of the electronic device is identified. The instructions also include identifying when the electronic device is in a second state and controlling the operation of the electronic device based on the measured temperature at the first position but not based on the measured temperature at the second position when the second state of the electronic device is identified.

In connection with any one of the aforementioned embodiments, the thermal management device or the method for manufacturing the thermal management device may alternatively or additionally include any combination of one or more of the previous embodiments.

The foregoing description is given for clearness of understanding only, and no unnecessary limitations should be understood therefrom, as modifications within the scope of the claims may be apparent to those having ordinary skill in the art.

The invention claimed is:

1. A method of thermal management, comprising:
at an electronic device comprising a first portion and a second portion, wherein the front surface of the first portion comprises a first display, and wherein the front surface of the second portion comprises a second display, the first portion and the second portion being rotatable relative to one another:
while the device is operating in an open configuration:
determining respective temperatures associated with front and back surfaces of each of the first and second portions; and operating the electronic device with a first set of thermal constraints, the first set of thermal constraints configured to prevent each of the respective temperatures from exceeding corresponding first temperature thresholds, wherein the first temperature thresholds correspond to safe temperatures for user skin contact;

detecting that the device is transitioning from the open configuration to a closed configuration, wherein in the closed configuration the back surface of the first portion is adjacent to the back surface of the second portion; and in response to detecting the transition, operating the electronic device with a second set of thermal constraints, the second set of thermal constraints configured to:

prevent the respective temperatures associated with the front surfaces from exceeding the corresponding first temperature thresholds, and allow the respective temperatures associated with the back surfaces to exceed the corresponding first temperature thresholds.

2. The method of claim 1, wherein the second set of thermal constraints are configured to prevent the respective temperatures associated with the back surfaces from exceeding corresponding second temperature thresholds, wherein the second temperature thresholds are greater than the first temperature thresholds, and wherein the second temperature thresholds corresponds to safe operating temperatures of one or more components of the electronic device.

3. The method of claim 1, wherein the second set of thermal constraints are configured to allow for increased system power as compared to the first set of thermal constraints.

4. The method of claim 1, wherein detecting the transition comprises detecting activation of a push to open mechanism.

5. The method of claim 1, wherein detecting the transition comprises detecting when the electronic device is closed based on a state of a user interface.

6. The method of claim 1, wherein the first portion abuts the second portion in the closed position.

7. The method of claim 1, wherein detecting the transition includes detecting when an angular position of the first portion relative to the second portion is less than or equal to a predetermined amount.

8. The method of claim 1, wherein in the closed configuration the back surface of the first portion contacts the back surface of the second portion such that a user may not contact the back surface of the first portion and the back surface of the second portion.

9. The method of claim 1, wherein allowing the respective temperatures associated with the back surfaces to exceed the corresponding first temperature thresholds includes turning off temperature sensors associated with the back surfaces.

10. A method of thermal management, comprising: at an electronic device comprising a first portion and a second portion, a front surface of the first portion comprises a first display and a front surface of the second portion comprises a second display, and the first portion and the second portion being rotatable relative to one another:

while the device is operating in an open configuration:
determining respective temperatures associated with front and back surfaces of each of the first and second portions; and
operating the electronic device with a first set of thermal constraints, the first set of thermal constraints configured to prevent each of the respective temperatures from exceeding corresponding first temperature thresholds, wherein the first temperature thresholds correspond to safe temperatures for user skin contact;

detecting that the device is transitioning from the open configuration to a closed configuration, wherein in the closed configuration the back surface of the first portion is adjacent to the back surface of the second portion; and in response to detecting the transition, operating the electronic device with a second set of thermal constraints, the second set of thermal constraints configured to:

prevent the respective temperatures associated with the front surfaces from exceeding the corresponding first temperature thresholds;

prevent the respective temperatures associated with the back surfaces from exceeding corresponding second temperature thresholds, wherein the second temperature thresholds are greater than the first temperature thresholds, and wherein the second temperature thresholds corresponds to safe operating temperatures of one or more components of the electronic device, and allow the respective temperatures associated with the back surfaces to exceed the corresponding first temperature thresholds.

11. The method of claim 10, wherein the second set of thermal constraints are configured to allow for increased system power as compared to the first set of thermal constraints.

12. The method of claim 10, wherein detecting the transition comprises detecting activation of a push to open mechanism.

13. The method of claim 10, wherein detecting the transition comprises detecting when the electronic device is closed based on a state of a user interface.

14. The method of claim 10, wherein the first portion abuts the second portion in the closed position.

15. A method of thermal management, comprising:
at an electronic device comprising a first portion and a second portion, a front surface of the first portion comprises a first display and a front surface of the second portion comprises a second display, the first portion and the second portion being rotatable relative to one another:

while the device is operating in an open configuration:
determining respective temperatures associated with front and back surfaces of each of the first and second portions; and
operating the electronic device with a first set of thermal constraints, the first set of thermal constraints configured to prevent each of the respective temperatures from exceeding corresponding first temperature thresholds, wherein the first temperature thresholds correspond to safe temperatures for user skin contact;

detecting that the device is transitioning from the open configuration to a closed configuration by detecting activation of a push to open mechanism, wherein in the closed configuration the back surface of the first portion is adjacent to the back surface of the second portion; and in response to detecting the transition, operating the electronic device with a second set of thermal constraints, the second set of thermal constraints configured to:

prevent the respective temperatures associated with the front surfaces from exceeding the corresponding first temperature thresholds, and allow the respective temperatures associated with the back surfaces to exceed the corresponding first temperature thresholds.

16. The method of claim 15, wherein the second set of thermal constraints are configured to prevent the respective temperatures associated with the back surfaces from exceeding corresponding second temperature thresholds, wherein the second temperature thresholds are greater than the first temperature thresholds, and wherein the second temperature thresholds corresponds to safe operating temperatures of one or more components of the electronic device.

17. The method of claim 16, wherein the second set of thermal constraints are configured to allow for increased system power as compared to the first set of thermal constraints.

18. The method of claim 17, wherein detecting the transition comprises detecting when the electronic device is closed based on a state of a user interface.

19. The method of claim 15, wherein the device is in the closed position when the push to open mechanism is in a locked position.

* * * * *